United States Patent [19]
Krohm et al.

[11] 3,946,860
[45] Mar. 30, 1976

[54] CONVEYOR CONSTRUCTION

[75] Inventors: Reinhold Krohm, Herne; Karl Bähre, Gladbeck, both of Germany

[73] Assignee: Klockner-Werke Aktiengesellschaft, Duisburg, Germany

[22] Filed: Oct. 2, 1974

[21] Appl. No.: 511,255

[30] Foreign Application Priority Data
Oct. 18, 1973 Germany............................ 2352289

[52] U.S. Cl. ............................................... 198/204
[51] Int. Cl.²....................................... B65G 15/60
[58] Field of Search ............ 198/204, 195; 403/292, 403/293, 62

[56] References Cited
UNITED STATES PATENTS

| | | | |
|---|---|---|---|
| 2,943,728 | 7/1960 | Dommann ........................... | 198/204 |
| 3,583,552 | 6/1971 | Renwick ........................... | 198/204 X |
| 3,680,682 | 8/1972 | Paul ..................................... | 198/204 |
| 3,752,299 | 8/1973 | Blumenthal et al.................. | 198/204 |
| 3,822,011 | 7/1974 | Braun et al. ......................... | 198/204 |

FOREIGN PATENTS OR APPLICATIONS

| | | | |
|---|---|---|---|
| 546,485 | 2/1932 | Germany ............................. | 198/204 |
| 1,035,243 | 4/1951 | France................................ | 198/204 |

*Primary Examiner*—Robert J. Spar
*Assistant Examiner*—James M. Slattery
*Attorney, Agent, or Firm*—Michael J. Striker

[57] ABSTRACT

A scraper conveyor has a conveyor trough composed of at least two longitudinally adjacent trough sections having respective side walls and juxtaposed terminal faces. A pair of first connecting members is welded to the side walls of one of the sections and recessed longitudinally thereof from the terminal face of the one section. These first connecting members have convex first end faces directed towards the terminal face of the one section, and exposed outer surfaces. A pair of second connecting members is welded to the side walls of the other of the sections and each of these has an end portion projecting beyond the terminal face of the other section. The end portions have second end faces which are each formed with a concave recess in which one of the convex end faces is received, and also exposed outer surfaces. Substantially keyhole-shaped recesses are formed in the exposed outer surfaces and each of these has a narrow portion provided with an open end located at the respective end face, and with a wider portion spaced from the respective end face. Coupling elements are received in the keyhole-shaped recesses and each of these has two enlarged end sections received in the respective wider portions, and a narrower section received in the narrow portions of the cooperating recesses. With this construction the thus connected trough sections have limited freedom of relative angular displacement in vertical and in horizontal direction.

19 Claims, 3 Drawing Figures

CONVEYOR CONSTRUCTION

BACKGROUND OF THE INVENTION

The present invention relates generally to conveyors and particularly to a novel conveyor construction, which is especially but not exclusively suitable for use in scraper conveyors.

The invention will be described with respect to a scraper conveyor, but it is not intended to be limited to this application.

In conveyors, particularly in scraper conveyors, a conveyor trough is provided which is usually composed of a plurality of longitudinally adjacent trough sections, which must be connected with one another. It is known to effect such connections by means of bolts, chain links or even rope connectors. Scraper conveyors are widely used in mining applications in which the surface on which they rest or the lateral surfaces of which then may come in contact, is frequently rough and uneven. For this reason, the connection between adjacent trough sections of such a conveyor should be such that it not only holds the connected trough sections together, but also permits a certain relative angular displacement in vertical and horizontal direction, within a limited range. On the other hand, care must be exercised that the trough sections remain properly aligned with one another, in order to avoid interference with the scraper chain or chains that move in the trough sections.

Experience has shown that in certain instances, particularly when these prior art conveyors are used in conjunction with high-production automatic coal mining machines, for instance of the coal plough type the instrumentalities used for connecting the consecutive trough sections are not as effective as is desirable. This is particularly true if such a conveyor is used in conjunction not only with a coal-removing machine but also in connection with a walking mine-roof support. When such a mine-roof support is advanced from one location to another, it is inevitable that consecutive conveyor sections be frequently angled relatively sharply with reference to one another. This causes substantially stresses to act upon the connecting and centering instrumentalities that have been used in the prior art, leading to damage and destruction. If bolts are used, the associated nuts are frequently simply stripped or the shaft of the bolt will be torn. This then requires repairs which are time consuming and which require unnecessary down-time. In instances when it is necessary under these circumstances to remove nuts, this is frequently very difficult, or not possible at all, because of corrosion due to the ambient moisture underground, or because of other problems. This then causes further difficulties.

SUMMARY OF THE INVENTION

Accordingly, it is an object of the present invention to avoid the aforementioned disadvantages.

More particularly, it is an object of the present invention to provide an improved conveyor, particularly but not exclusively a scraper conveyor, which is not possessed of these disadvantages.

Still more specifically, it is an object of the present invention to provide an improved conveyor in which longitudinally adjacent trough sections of the conveyor trough are so connected that even when they are angled substantially with reference to one another, no damage will occur to the connecting and centering instrumentalities.

A further object of the invention is to provide such a conveyor wherein the connection of longitudinally adjacent trough sections can be carried out simply and rapidly, and the same is true of a disassembly.

In keeping with these objects, and with others which will become apparent hereafter, one feature of the invention resides in a conveyor, particularly a scraper conveyor, in a combination which comprises a conveyor trough composed of at least two longitudinally adjacent trough sections having respective side walls and juxtaposed terminal faces. A pair of first connecting members are welded to the side walls of one of the sections and recessed longitudinally thereof from the terminal face of the one section. The first connecting members have respective convex first end faces which are directed towards the terminal face of the one section, and they also have exposed outer surfaces. A pair of second connecting members is welded to the side walls of the other of the sections and each of these has an end portion projecting beyond the terminal face of the other section. These end portions have second end faces each formed with a concave recess in which one of the convex end faces is received, and they also have exposed outer surfaces. Substantially keyhole-shaped recesses are formed in the exposed outer surfaces and each of these has a narrow portion provided with an open end located at the respective end face, and with a wider portion spaced from the respective end face. Coupling elements are received in the keyhole-shaped recesses and each of these has two enlarged end sections received in the wider portions of adjacent keyhole-shaped recesses of the first and second connecting members and a narrower section received in the narrow portions of the cooperating recesses, so that the trough sections are firmly connected but can be angled relative to one another to a limited extent both in vertical and in horizontal direction.

The outer surfaces of the side walls of the trough sections are inwardly recessed in a V-shaped configuration, so as to form a V-shaped groove extending longitudinally of the respective side wall. The first and second connecting members are located in these respective grooves, and extend over the entire height of the latter. This means that the connecting members, which act as centering means for the conveyor trough sections, can be relatively large; this in turn, means that the coupling elements can be constructed and mounted much more advantageously than would otherwise be the case, there being more space available and there being no need to resort to threaded coupling elements. The coupling elements mentioned above are instead simply inserted into the keyhole-shaped recesses and, as will be clear from the subsequent detailed description, they will not be subjected to bending moments in a horizontal plane, but instead will be subjected only to tensile forces. The welds connecting the connecting members to the side walls of trough sections can be very long, thus serving to further secure the connecting members against bending and breaking. Thus, the invention eliminates a major source of damage and repair as well as the machine down-time connected therewith.

It is particularly advantageous if the coupling elements are each of one piece and are either produced by casting or by forging. The narrower section of the coupling elements, which is in operation subjected to tensile stresses, may be of rectangular cross section, or could also be of trapezoidal cross section, although other cross sections are also suitable.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 3:
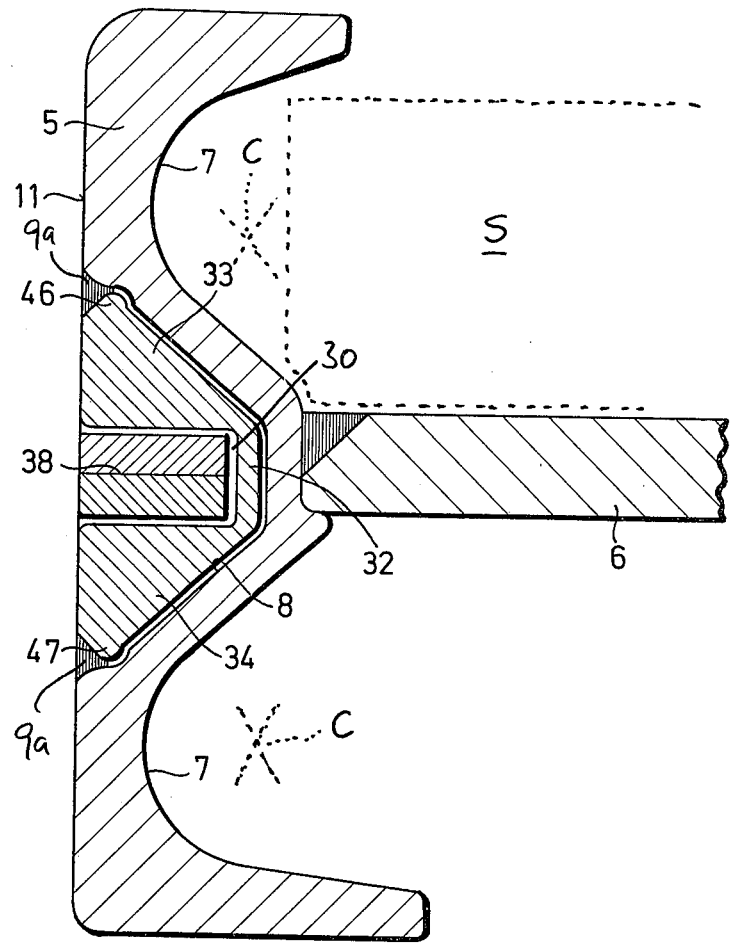
FIG. 3 is a section taken on line III—III of FIG. 1.

In the Figures we have illustrated two longitudinally adajcent conveyor trough sections 3, 4, and in particular (see FIG. 1) the longitudinally adjacent end portions 1 and 2 of the trough sections 3 and 4. As shown diagrammatically in FIG. 3 (see the dotted lines) conveyor chains C forming an upper and a lower run travel in concave recesses 7 formed in the inner side of side walls 5 (one shown) of the respective conveyor trough sections. The chains C have connected to them scraper elements S which advance longitudinally of the conveyor trough sections and scrape material such as coal or the like, over the upper surface of a horizontal partition wall 6 which connects the two side walls 5 of the respective trough section with one another. Only a single side wall 5 is shown in FIG. 3, it being understood that the other side wall of the same trough section is identical with the one shown, but is mirror-symmetrical relative thereto. The partition wall 6 is welded to the side walls as indicated in FIG. 3.

The outer sides of the side walls 5 are formed with respective longitudinally extending grooves 8 of substantially V-shaped cross-section with the V lying on its side.

The connection of two longitudinally extending trough sections of a conveyor trough, especially of a scraper conveyor trough, necessitates that these trough sections be capable of being angled relative to one another in horizontal as well as in vertical direction, for the reasons outlined earlier, namely to be able to accommodate them to uneven supporting or contact surfaces, and also to be able to accommodate themselves to forces acting upon them when an associated coal plough or the like travels along them and acts upon the mine face.

Figure 1:
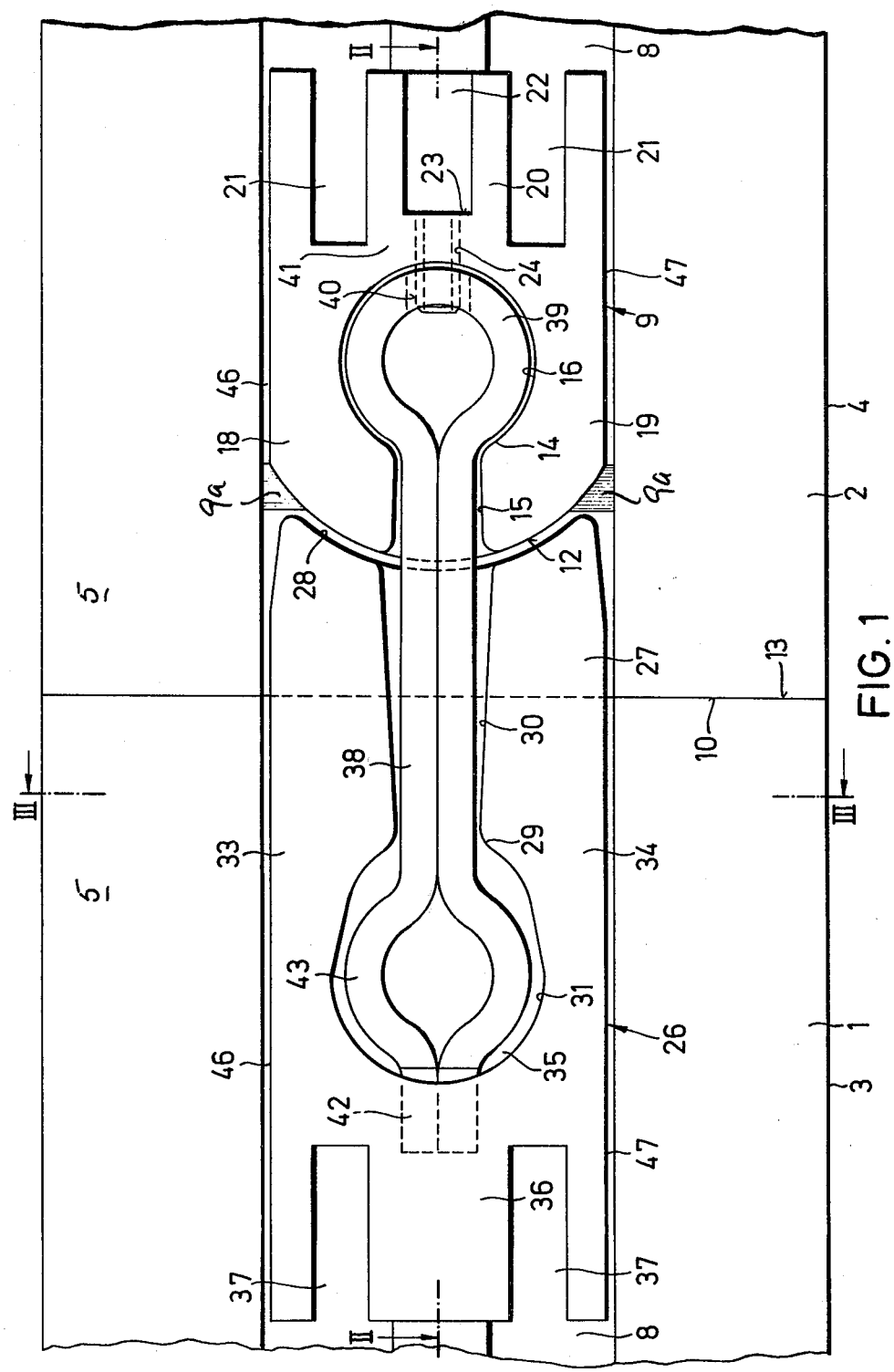
FIG. 1 is a fragmentary side view, illustrating connected end portions of two longitudinally connected trough sections which are incorporated in the invention.
Figure 2:
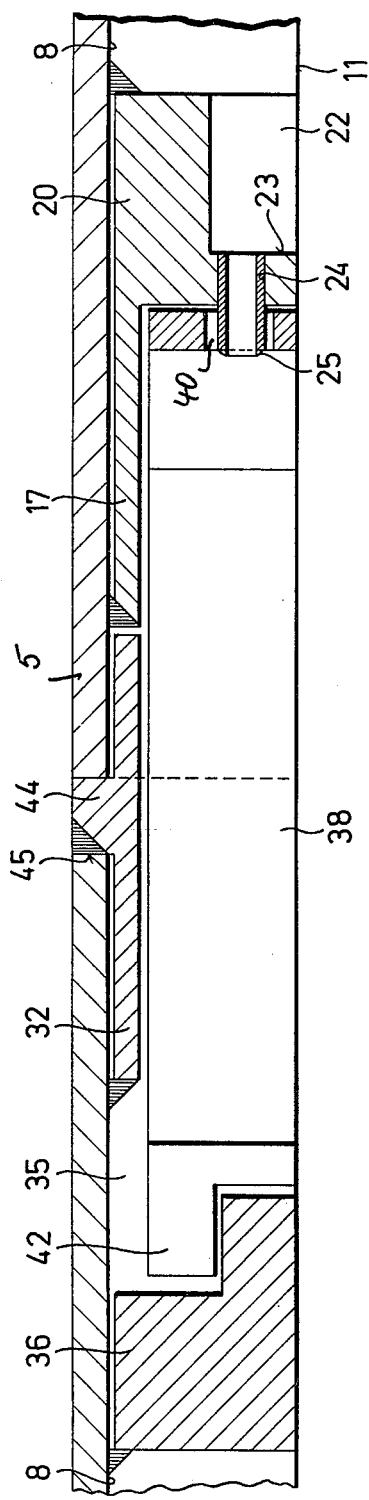
FIG. 2 is a section taken on line II—II of FIG. 1.

To make this accommodation of the trough sections with reference to one another possible, a pair of connecting members 9 (one shown) is received in the respective grooves 8 (see FIG. 3), being welded to the trough section 4 at 9a. It will be understood that in the opposite side walls of the trough section 4 the connecting members 9 are arranged mirror-symmetrically relative to one another. As FIGS. 1 and 2 show, the connecting members 9 are recessed from the terminal face 10 of the trough section 4 in longitudinal direction of the latter; they are located in the plane of the outer surfaces 11 of the side walls 5, extend over the entire height of the respective grooves 8 and have a cross-section (see FIG. 3) which is as faithfully as possible acccommodated to the cross-sectional configuration of the grooves 8.

Those end faces of the connecting members 9 which face towards the terminal face 10 of the trough section 4 are convexly curved and are identified with reference numeral 12. The outer exposed surfaces of the connecting members 9 are formed with inwardly extending recesses which also extend rearwardly from the end faces 12 and are identified with reference numeral 14. They are substantially keyhole-shaped and are composed of a slot portion 5 which slightly diverges towards the respective end face 12, and which has rounded corners, and with an inner enlarged portion 16 which in the illustrated embodiment is of substantially circular outline. The depth of the recesses 14 in direction inwardly of the respective side walls 5 is so chosen that in the innermost region of the grooves 8 there remain wall portions 17 between the upper and lower portions 18 and 19 of the respective connecting portions 9 (see FIG. 2). This assures that the connecting members 9 have a particularly good resistance to twisting.

The opposite ends of the connecting members 9, that is the one that are remote from the end faces 12, are formed with upper and lower cutouts 21 which may be of the T-groove type, and into which bolts can be inserted which may serve to mount guide tracks for a coal plough, or any other desired component. Intermediate the cutouts 21 there are formed depressions 22 from whose inner end faces 23 bores 24 extend to the respective recess portions 16.

A pair of second connecting members is associated with the trough section 3. These are also located in the grooves 8 of the trough section 3 and are welded in place just as the connecting members 9. They have the full height of the grooves 8 and fill substantially the entire cross-section thereof. The connecting members 26 are flush with the outer surfaces 11 of the side walls 5. Their length is greater than that of the connecting members 9 and they are provided with end portions 27 which extend outwardly past the terminal face 13 of the trough section 3 and into the respectively opposite grooves 8 of the trough section 4. These end portions 27 therefore serve to center the trough sections 3, 4 by providing great stability for them. The free ends or end faces of the end portions 27 are formed with concave recesses 28 which are largely accommodated to the convexity of the end faces 12 of the connecting members 9, which end faces indeed are received in the respective concavities 28.

The exposed outer surfaces of the connecting members 26 are also provided with keyhole-shaped recesses 29 which extend inwardly with reference to the respective side walls 5 and rearwardly from the concavities 28. The recesses 29 are also composed of a slot portion 30 which diverges towards the respective concavity 28 and of a substantially pear-shaped enlarged portion 31. The larger cross-sectional surface area of the portion 31 is located closer to the center of the trough section, and the depth of the recesses 29 is so selected as is the depth of the recesses 14, that over the major portion of the length of the connecting members 26 and along the innermost part of the grooves 8 there remain wall portions 32 between the upper and lower wall portions 33 and 34, so that the connecting members 26 retain a high strength despite the presence of the recesses 29.

The wall portions 32 are omitted approximately in the region of the greater cross-sectional surface areas of the enlarged portions 31 so that behind these portions there are provided spaces 35 (see FIG. 2) whose purpose will be discussed later.

The rear ends 36 of the connecting members 26 are provided with upper and lower cutouts 37 corresponding to the cutouts 20 and which may be of T-groove cross-section and serve to accommodate screw bolts which again may be used to hold in place guide tracks for a coal plough or any other desired component.

The recesses 14 and 29 serve to accommodate coupling elements 36. In the illustrated embodiment, these coupling elements are each formed of a one-piece steel strip that is bent double upon itself, so that at one end there is formed a knot-shaped enlargement 39 the configuration of which corresponds substantially to that of the portion 16 of the recess 14. At the apex of the enlargement 39 there is formed a bore 40 having a greater cross section than the bore 24 which is provided in the wall portion 41 and through which an expansion bolt 25 may be inserted for mounting purposes.

At the opposite end of the coupling elements 38, where the free ends 42 of the steel strip are located, the latter are deformed so as to form another knot-shaped enlargement 43. FIG. 2 shows that the width of the free ends 42 is reduced by approximately half the total width of the steel strip, so that the remaining portions can project into the aforementioned space 35. The thickness of each steel strip section corresponds to approximately one-third to one-quarter the width of the steel strip section.

The coupling elements 38 are installed in the following manner. First, the terminal faces 10, 13 of the trough sections 3, 4 are abutted or substantially so. Now, the portions 42 are inserted into the space 35 at an angle and the enlarged portion 43 enters into the recess portion 31. The opposite end of the coupling element 38 (the right-hand end in FIG. 1) is then also pushed into the recess until the enlarged portion 39 becomes lodged in the recessed portion 16 and the entire coupling element 38 is located in the cooperating slot-shaped recesses 14, 29, of the two trough sections 3, 4. The expansion bolt 25 is then driven into the bore 40 and the coupling element 38 is now reliably fixed.

When for any reason the coupling element 38 is to be removed, it is advantageous to first fully drive the expansion bolt 25 into the interior of the enlarged portion 39, whereupon the latter can be laterally withdrawn from the recess portion 16 and subsequently withdrawn at an angle from the recess portion 31 and the space 35.

To further fix the connecting members 26 in place, the latter may also be formed with an inner projection 44 (compare FIG. 2) which engages in a corresponding recess 45 of the trough section 3 and is there welded in place.

The connecting members 9 and 26 are welded to the side walls 5 along the upper and lower longitudinal edges 46 and 47, and in the region of the end faces in the angle defined between the end faces and the walls bounding the grooves 8. This means that there are very long welding seams present which assure a reliable connection of the connecting members 9 and 26 with the respective side walls 5.

It will be noted that the connecting members 9 and 26 are so configurated that they can be readily produced in one piece by stamping or else by casting. It will also be understood that the coupling elements 38 need not be of steel strips but could be forgings or castings which would preferably be of solid cross section rather than having the hollows shown for the portions 39 and 43 in the illustrated exemplary embodiment.

To further protect the positioning of the coupling elements 38 it is advantageous if those surfaces which in tension come in contact with the convexly curved surfaces of the portions 39 and 43 of the coupling elements 38, are conically undercut. This conecity assures a self-centering of the coupling elements 38 in the respective recesses 14, 29 when subjected to tension. Moreover, stresses on the expansion bolts 25 are reduced and there will be an optimum surface-to-surface engagement between the coupling elements and the surfaces bounding the recess portions 16, 31. in this case the expansion bolts 25 serve only the purpose of preventing the coupling elements 38 from falling out of the recesses 14, 29 under no-stress conditions.

The spaces 35 may also be modified to constitute a part of the portion 31, in which case the latter is somewhat enlarged and a nose provided in the circumferential region of the portion 31 which faces away from the curved end face 28.

The expansion bolts 25 could be replaced with solid cross-section bolts in which case it is advantageous if these are provided with a nose-shaped radially extending projection located in the cutout or recess 22, by means of which they can be manipulated.

The connecting members 9, 26 could also be so configurated that in the end regions of the trough sections 3, 4 they reverse the wall portions bounding the grooves 8.

If a steel strip is used to produce the coupling elements 38, as in the illustrated exemplary embodiment, this is a particularly advantageous and inexpensive way of making the coupling elements 38, and it has the further advantage that the portions 39, 43 of the coupling elements 38 provide a spring characteristic since they can yield somewhat, which is advantageous because it tends to absorp sudden stresses at least to some extent.

It is also advantageous if one of the enlarged portions of the coupling elements 38, such as the portion 39, has its free end slightly flattened or thickened in a T-shaped configuration. This makes it possible to connect other components to it.

The largely mating configuration of the portion 39 and of the recess portion 16, and the play between them, assures that the portion 39 can tilt or pivot to some extent in the recess portion 16 but cannot perform any other substantial movements therein.

The installation of the expansion bolt 25 is effected by placing the expansion bolt into the depression 22 and driving it through the bore 24 so that it projects into the bore 40. It is currently preferred that the bolt be received with play in the bore 40, in order to obtain a maximum relative angling in horizontal and vertical directions of the connected trough sections 3, 4. In place of the expansion bolt 25 it is possible to use a solid cross-section bolt having the radial projection mentioned before, or else a screw.

The somewhat pear-shaped configuration of the recess portion 31 assures that the portion 43 of the coupling elements 38 can perform a certain amount of movement in longitudinal direction of the trough section 3, which facilitates horizontal and vertical angling of the trough sections 3, 4 relative to one another.

One of the significant advantages of the construction according to the present invention is that in the event of extreme forces acting upon the trough sections, the coupling elements 38 will be destroyed long before the forces can reach such a level that they could do damage to the connecting members 9, 26 or the trough sections 3, 4 themselves. This keeps any possible damage to an absolute minimum, since it will require only the replacement of he coupling elements 38.

It will be understood that each of the elements described above, or two or more together, may also find a useful application in other types of constructions differing from the types described above.

While the invention has been illustrated and described as embodied in a conveyor, particularly a scraper conveyor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. In a conveyor, particularly a scraper conveyor, a combination comprising a conveyor trough composed of at least two longitudinally adjacent trough sections having respective side walls and juxtaposed terminal faces; a pair of first connecting members welded to said side walls of one of said sections and recessed longitudinally thereof from the terminal end face of said one section, said first connecting members having convex first end faces directed towards said terminal end face of said one section, and outer surfaces facing away from the side walls of said one section; a pair of second connecting members welded to said side walls of the other of said sections and each having an end portion projecting beyond the terminal end face of said other section, said end portions having second end faces each formed with a concave recess in which one of said convex end faces is received, and outer surfaces facing away from the side walls of said other section; substantially keyhole-shaped recessed formed in said outer surfaces and each having a narrow portion with an open end located at the respective end face and a wider portion spaced from the respective end face, each of said narrow portions diverging from the respective wider portion toward the associated end face and said wider portions of said keyhole-shaped recesses in said first connecting member being of substantially circular outline; and coupling elements received in said keyhole-shaped recesses and each having two enlarged end sections received in the wider portions of said adjacent keyhole-shaped recesses of said first and second connecting members and a narrow section received in said narrow portions of said cooperating recesses, said enlarged end sections received in said wider portions of said keyhole-shaped recesses in said first connecting members having an outer surface substantially matching said circular outline so that said trough sections are connected against separation in longitudinal direction but can be tilted relative to one another to a limited extent in vertical and horizontal direction.

2. A combination as defined in claim 1, wherein said coupling elements are each of one-piece construction.

3. A combination as defined in claim 1, wherein said end sections are at least in part bounded by outer surface parts which are convexly curved about an axis extending normal to the elongation of said trough sections.

4. A combination as defined in claim 3, wherein said keyhole-shaped recesses have undercut portions which are arranged to engage with said outer surface parts.

5. A combination as defined in claim 1, wherein each of said coupling elements is composed of a steel strip which is doubled back upon itself and formed at spaced locations with eyelet-shaped bulges constituting said end sections.

6. A combination as defined in claim 1, wherein the contours of said wider portions of said keyhole-shaped recesses correspond at least substantially to the contours of the end sections which are respectively received in said wider portions.

7. A combination as defined in claim 1, wherein said side walls of said trough sections each have an outer side formed with a groove which extends longitudinally of the respective trough section and is of V-shaped cross-section; each connecting member being received in and having an inner surface facing inwardly of a respective groove; and wherein said keyhole-shaped recesses each extend from said outer surfaces towards but over at least part of their length short of the respective inner surface.

8. A combination as defined in claim 7, wherein said inner surfaces are contoured to mate with the V-shape of the respective groove.

9. A combination as defined in claim 7, wherein one end section of each coupling element is formed with a flattened part.

10. A combination as defined in claim 1, wherein the enlarged end sections received in the wider portions of said keyhole-shaped recesses in said first connecting members are each formed with a bore extending longitudinally of the respective coupling element; and further comprising a securing member received in the respective bore and connected with the respective first connecting member adjacent said bore.

11. A combination as defined in claim 10, wherein said first connecting members are each formed with a cutout extending longitudinally of the respective connecting member to the region of the respective wider portion, to permit installation of said securing member in said cutout.

12. A combination as defined in claim 10, wherein said securing members are bolts each having a portion which is received with play in the respectively associated bore.

13. A combination as defined in claim 10, wherein said securing members are bolts each having a main portion and an engaging portion which projects radially from said main portion.

14. A combination as defined in claim 10, wherein said securing members are expansion bolts.

15. A combination as defined in claim 1, wherein the wider portions of the keyhole-shaped recesses in said second connecting members are of substantially pear-shaped contour.

16. A combination as defined in claim 1, wherein said coupling elements each have an end projection which extends from that one of said end sections that is received in the wider portion of said keyhole-shaped recesses in said second connecting members, said end projection having a depth in direction inwardly of the respective recess which is less than the depth of the remainder of the respective coupling element, and said end projection engaging into a space formed adjacent said wider portion in which the associated end section is received.

17. A combination as defined in claim 1, wherein said connecting members each have rear end faces facing away from said first and second end faces, respectively, and being provided with cutouts arranged to receive respective bolts.

18. A combination as defined in claim 1, wherein said connecting members are forgings.

19. A combination as defined in claim 1, wherein said connecting members are castings.

* * * * *